United States Patent Office 3,597,444
Patented Aug. 3, 1971

3,597,444
METHOD OF SYNTHESIZING SELENOUREAS FROM THIOUREAS
Daniel L. Klayman, Chevy Chase, and Robert J. Shine, West Hyattsville, Md., assignors to the United States of America as represented by the Secretary of the Army
No Drawing. Filed Apr. 2, 1969, Ser. No. 812,872
Int. Cl. C07d 49/34
U.S. Cl. 260—309.7                    4 Claims

ABSTRACT OF THE DISCLOSURE

This invention relates to the preparation of selenoureas having either aliphatic or aromatic substituents by displacement of the thiomethyl moiety from S-methylthiopseudoureas by hydroselenide ions in solutions having a pH of 8 to 9. This method provides yields of substituted selenoureas in the range of 60–70 percent. Selenoureas are useful in synthesizing a wide variety of seleno substituted compounds, for example the seleno substituted steroids of U.S. Pat. No. 3,372,173.

The invention described herein may be manufactured and used by or for the Government for governmental purposes without the payment to us of any royalty thereon.

BACKGROUND OF THE INVENTION

(1) Field of the invention

In the course of investigation of the behavior of S-methyl derivatives of various thioureas toward alkali, it was found that the S-methyl derivatives of all but trisubstituted thioureas form methyl mercaptan and the corresponding urea. Subsequent work with sulfide ion as the nucleophile showed that the thiomethyl moiety could be displaced from all S-methylthiopseudoureas, including those which are trisubstituted to regenerate the original thiourea.

(2) Description of the prior art

Selenium analogs of ureas have been synthesized by various methods. For example, selenoureas and mono- and 1,1-disubstituted selenoureas have been prepared by the reaction of hydrogen selenide with cyanamides, while the reaction of hydrogen selenides with carbodiimides has resulted in the formation of mono- and 1,3-disubstituted selenoureas. The reaction of alkyl, acyl, and aryl isoselenocyanates with ammonia or amines has led to the preparation of mono-, 1,3-di, and trisubstituted selenoureas. 1,1,3,3-tetramethyl-2-selenourea has been made by the reaction of phosphorus pentaselenide with tetramethyl urea. The prior art procedures all have limited utility due to poor yields, and no single procedure can be universally used to prepare all types of selenoureas.

Selenoureas have a wide variety of uses to form seleno substituted medicinal compounds. Mautner and Clayton in J. Am. Chem. Soc., 81 6270 (1959) used selenourea to prepare 2-selenobarbiturates to increase lipid solubility. Segaloff and Gabbard in Steroids, 5, 219 (1965) and U.S. Pat. No. 3,372,173, used selenoureas to prepare 3β-Selenosteroids. Mautner, Kumler, Okano, and Pratt in Antibiotics and Chemotherapy, 6, 51 (1956) used selenoureas to prepare selenosemicarbazones having antifungal and antitubular activity.

SUMMARY

This invention includes the use of the hydroselenide ion as the attacking nucleophile on S-methylthiopseudoureas possessing a variety of N-substitution patterns.

Accordingly, it is an object of this invention to provide a method of synthesizing stable selenoureas with a high yield.

It is another object to provide a method of synthesis applicable to a wide variety of substituted selenoureas.

These and other objects will become apparent with reference to the following description.

DESCRIPTION OF THE PREFERRED EMBODIMENTS

It has been discovered that selenoureas can be prepared, for the most part, in good yield from all thiopseudoureas regardless of the degree or nature of the N-substitution according to the following reactions;

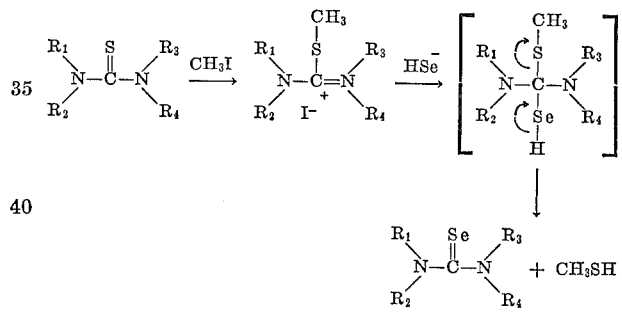

|        |           |          |          |          |         | Percent |                |        | Analysis |       |       |       |
|--------|-----------|----------|----------|----------|---------|---------|----------------|--------|----------|-------|-------|-------|
|        |           |          |          |          |         |         |                | Calc'd |          | Found |       |       |
| Number | R₁        | R₂       | R₃       | R₄       | M.P., °C. | yield | Recryst. solvent | N      | Se       | N     | Se    |       |
| 1      | H         | H        | H        | H        | ¹ 223–225 | 10    | H₂O            | 22.77  | 64.19    | 22.29 | 63.37 |       |
| 2      | C₂H₅      | H        | H        | H        | ¹ 123–125 | 74    | CHCl₃-hexane   | 18.54  | 52.27    | 18.52 | 52.73 |       |
| 3      | C₆H₅      | H        | H        | H        | ¹ 190–192 | 79    | do             | 14.07  | 39.66    | 14.07 | 39.55 |       |
| 4      | C₆H₅      | C₂H₅     | H        | H        | ¹ 205–207 | 80    | do             | 10.18  | 28.69    | 10.22 | 28.74 |       |
| 5      | C₆H₅      | H        | C₆H₅     | H        | ¹ 178–182 | 51    | EtOH           | 10.18  | 28.69    | 9.93  | 28.81 |       |
| 6      | CH₃       | CH₃      | C₆H₅     | H        | 108–110   | 80    | CHCl₃-hexane   | 12.33  | 34.76    | 11.86 | 34.71 |       |
| 7      | CH₃       | CH₃      | CH₃      | CH₃      | 79–81     | 72    | Hexane         | 15.64  | 44.08    | 15.92 | 44.36 |       |
| 8      | NH₂       | H        | H        | H        | ¹ 189–191 | 67    | EtOH           | 30.44  | 57.20    | 30.22 | 56.79 |       |
| 9      | C₆H₅NH    | H        | H        | H        | ¹ 195–197 | 47    | CH₂Cl₂         | 19.62  | 36.87    | 19.57 | 36.91 |       |
| 10     | C(=S)NH₂  | H        | H        | H        | ¹ 185–188 | 22    | g              | 23.08  | 43.36    | 22.86 | 42.78 |       |
| 11     | (H-N, N-H ring, C=Se) | | | | ¹ 230–232 | 71 | EtOH       | 19.05  | 53.70    | 18.96 | 53.94 |       |

¹ Decomposition.

Especially noteworthy is the preparation of the difficultly attainable 1,1,3,3-tetramethyl-2-selenourea:

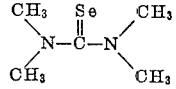

3-selenosemicarbazide, and 1-phenyl-3-selenosemicarbazide The previously unknown 2-seleno-4-thiobiuret was synthesized from 2-methyl-2,4-dithiopseudobiuret hydroiodide:

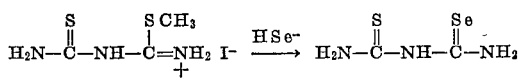

Selenourea, itself, however, could not be prepared in good yield.

The selenoureas prepared according to this invention were relatively stable if stored in the dry state in the absence of air and light, and could be recrystallized from chloroform-hexane or ethanol. Heating the selenoureas in water and in some instances in ethanol caused slight decomposition of the selenoureas.

The process of this invention may be described as follows. A solution of sodium hydroselenide, prepared by the addition of hydrogen selenide gas to an aqueous-ethanolic solution of sodium bicarbonate, was combined with an ethanolic solution of S-methyl thiopseudourea hydroiodide. The pH of the solution was then immediately adjusted to 8–9 by the addition of sodium bicarbonate.

2-methyl-2 thiopseudourea hydroiodides for conversion to selenoureas were prepared as follows. An ethanol solution of a thiourea was heated under reflux for 0.5–1.0 hours with 1.1 equivalents of methyl iodide. Evaporation of the solvent under reduced pressure gave the 2-methyl-2 thiopseudourea hydroiodide which generally could be purified by recrystallization from ethanol-ether.

2-methyl-2,4-dithiopseudobiuret hydroiodide for conversion to 2-seleno-4 thiobiuret was prepared by adding 20.3 grams (0.15 mole) dithiobiuret suspended in 75 ml. of acetonitrile to 35.5 grams (0.25 mole) of methyl iodide. The mixture was then heated under reflux for 40 minutes. The solution was concentrated and cooled, giving white crystals (34.1 grams or 82% yield) of 2-methyl-2,4-dithiopseudobiuret hydroiodide having a melting point of 150–152°, recrystallized from acetonitrile.

*Analysis.*—Calculated for $C_3H_8IN_3S_2$ (percent): C, 13.00; H, 2.91; I, 45.79; N, 15.16; S, 23.14. Found (percent): C, 12.78; H, 2.77; I, 45.81; N, 15.28; S, 23.47.

Selenoureas are synthesized according to the following example. Hydrogen selenide, generated by adding 50 ml. of 6 N sulfuric acid to 11.5 grams of powdered aluminum selenide (90% purity), was passed slowly into a solution of 8.25 grams (0.10 mole) of sodium bicarbonate in 250 ml. of water and 100 ml. of ethanol maintained at 0°. The resulting clear red solution contained about 0.10 mole of sodium hydroselenide.

To a solution of 0.05 mole of a 2-methylthiopseudourea hydroiodide in 50 ml. ethanol was added 350 ml. of the sodium hydroselenide solution described above, containing an additional 0.05 mole of sodium bicarbonate. The combined clear red solution, which had a pH of 8 to 9, was permitted to stand at room temperature for approximately 20 hours. Any crystals which formed were collected. Nitrogen gas was then passed through the filtrate, which was treated with 15 ml. of glacial acetic acid, to dispel methyl mercaptan and hydrogen selenide. Any elemental selenium which formed was removed by filtration and the solution was concentrated at reduced pressure from 70 to 100 ml. and allowed to stand at 0° until crystals formed. The selenourea was collected and recrystallized from chloroform-hexane or ethanol. The selenoureas are white or off-white compounds which usually turn pink or gray when allowed to stand in air.

An indication of the present of a selenocarbonyl group was achieved by adding a few drops of 3% hydrogen peroxide to several milligrams of a selenourea dissolved in a small volume of methanol. Red elemental selenium precipitated from the solution within 30 seconds, however, in some instances, heating the test mixture on a steam bath for 15 seconds was required. No elemental selenium was obtained in treatment of 2-imidazolineselenone with hydrogen peroxide solution.

Ammoniacal silver nitrate was found to react with all the selenoureas but 2-imidazolineselenone to give a black precipitate of silver selenide. In contrast, the analogous trisubstituted thioureas and 1,1,3,3-tetramethyl-2-thiourea failed to react with this reagent to give silver selenide.

Hydrogen selenide was generated by addition of dilute sulfuric acid to finely pulverized aluminum selenide, in the manner of Bennett and Zingaro. See Organic Synthesis, Coll. vol. IV, John Wiley and Sons, Inc., New York, N.Y., p. 359 (1963). Their procedure was modified in that no external heat was applied to the exothermic reaction. The in situ generation of hydrogen selenide by addition of aluminum selenide to an aqueous solution of the S-methyl thiopseudourea was tried, but the difficulties encountered in separating the product from the inorganic by-product (mainly aluminum hydroxide) negated whatever advantage was gained by this technique.

We claim:
1. The method of synthesizing selenourea comprising:
  (a) reacting S-methylthiopseudourea hydroiodide with hydrogen selenide in a solution having a pH of 8 to 9; and
  (b) isolating selenourea crystals from the said solution.
2. The method of synthesizing 2-seleno-4 thiobiuret comprising:
  (a) reacting 2-methyl-2,4-dithiopseudobiuret hydroiodide with hydrogen selenide in a solution having a pH of 8 to 9; and
  (b) isolating 2-seleno-4 thiobiuret crystals from the said solution.
3. The method of synthesizing a selenourea comprising:
  (a) reacting by heating under reflux a thiourea having a formula of

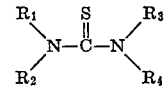

wherein $R_1$ is member selected from the group consisting of hydrogen, methyl, ethyl, amino, phenyl, anilino, and thiocarbamoyl; $R_2$ is a member selected from the group consisting of hydrogen, methyl, and penyl; $R_3$ is a member selected from the group consisting of hydrogen, methyl, and phenyl; and $R_4$ is a member selected from the group consisting of hydrogen and methyl; with methyl iodide to form the corresponding 2-methyl-2 thiopseudourea hydroiodide;
  (b) reacting the 2-methyl-2 thiopseudourea hydroiodide with a hydroselenide solution having a pH of 8 to 9 to form the corresponding selenourea; and
  (c) isolating the said selenourea crystals.
4. The method of synthesizing 2-imidazolineselenone comprising:
  (a) reacting by heating under reflux 2-imidazolinethione with methyl iodide to form 2-methylthioimidazolidine hydroiodide;
  (b) reacting the said 2-methylthioimidazolidine hydroiodide with hydrogen selenide in a solution having a pH of 8 to 9; and
  (c) isolating 2-imidazolineselenone crystals from the said solution.

References Cited

JACS, 78: 5292 (1956), Mautner, The Chemistry of Open Chain Organic Nitrogen Compounds, vol. I, page 271 (1965), Smith.

HENRY R. JILES, Primary Examiner

S. D. WINTERS, Assistant Examiner

U.S. Cl. X.R.

260—551R, 552R, 564E